United States Patent [19]
Koch

[11] Patent Number: 4,710,487
[45] Date of Patent: Dec. 1, 1987

[54] DIESEL EXHAUST GAS CATALYST

[76] Inventor: Christian Koch, Muhlweg 13, 8570 Pegnitz, Fed. Rep. of Germany

[21] Appl. No.: 827,412

[22] Filed: Feb. 7, 1986

[30] Foreign Application Priority Data

Feb. 11, 1985 [DE] Fed. Rep. of Germany ....... 3504556

[51] Int. Cl.$^4$ .................. B01J 23/10; B01J 23/12; B01J 23/74
[52] U.S. Cl. ................................. 502/303; 502/525; 423/215.5
[58] Field of Search .............................. 502/303, 525; 423/215.5

[56] References Cited

U.S. PATENT DOCUMENTS 4,055,513  10/1977  Wheelock ..................... 502/525
4,515,758   5/1985  Domesle et al. .............. 423/215.5

FOREIGN PATENT DOCUMENTS 50-43091  4/1975  Japan ........................... 502/525

Primary Examiner—W. J. Shine
Attorney, Agent, or Firm—Collard, Roe & Galgano

[57] ABSTRACT

A catalyst for the reaction of hydrocarbons and gases and for the reduction of nitric oxides, includes the active substance thorium oxide in addition to $LaCoO_3$. The catalyst has as the wash coat oxide-ceramic materials and spinels of the oxides of magnesium, aluminum, titanium and zirconium, with an addition of cerium oxide and lanthanum oxide, and preformed and acid-solubilized $LaCoO_3$ as the active substance. The catalyst is formed without the active substance $LaCoO_3$ for use as a high-temperature combustion catalyst. A process and apparatus is set forth for the application of the catalyst for after-burning of exhaust gases from diesel engines, with catalyst filler layers eccentrically disposed with respect to each other for the adsorption of soot particles, and with a catalyst honeycomb for after-burning and nitric oxide-reduction. The after-burning device is suitable also as a muffler.

21 Claims, 2 Drawing Figures

DIESEL EXHAUST GAS CATALYST

BACKGROUND OF THE INVENTION

The invention relates to a catalyst for converting unburned hydrocarbons and for the reduction of nitric oxides alone and also with other combustible gases, such as ammonia or hydrogen.

The catalyst of the invention has been found through long experimentation and is based on the action of thorium oxide as a catalyst stabilizer in the production of catalytic layers. Catalysts based on noble metals, metal oxides and especially on metal compound oxides such as $LaCoO_3$ require special stabilizers to provide a long service life and to maintain the catalyst activity, or as a protection against chemical changes caused by other layers such as wash coats and by their trace contaminants.

It has now been found that thorium oxide plays a surprising and decisive part as such a stabilizer and supplies an especially efficient catalyst substance in a special composition with the components lanthanum oxide and $LaCoO_3$. The catalytic action is not achieved without the participation of thorium oxide in the catalyst complex.

A special field of application for such a catalyst is in the treatment of exhaust gases of Diesel engines, wherein the catalyst makes use of the unburned components, in particular soot and unburned hydrocarbons, as reduction agents for reducing nitric oxide. In this process, the unburned components are burned with the oxygen excess of the exhaust gas and the oxygen of the nitric oxides, and in this way are rendered harmless.

Previously, carbon black filters have been proposed which store the unburned substances in the wall area of ceramic bodies and subsequently burn these substances after the combustion temperature has been reached. In some cases, the combustion temperature was reduced due to the introduction of catalysts. These filters require a large volume in order to avoid an excessive loss of pressure in the exhaust system. Furthermore, residues of oil ash remain in the walls of the filter and are not removed in the combustion process. The residues then cause a continuous increase in the pressure loss of the filters. Finally, this leads to tearing of the filter walls, and the filter becomes unusable.

An invention according to German patent application No. P 33 40 682 proposed to avoid these disadvantages by placing an exhaust gas catalyst in the stream of exhaust gas of a Diesel engine, with the catalyst being expected to effect the combustion of the unburned components. However, with this invention, special problems are created by the considerable amount of carbon black or soot accumulating in the starting phase, because the reaction temperature of the catalyst is not yet reached in the starting phase.

Accordingly, it is an object of the present invention to provide a catalyst for reacting unburned hydrocarbons and reducing nitric oxides in diesel engine exhaust gases.

It is also an object of the present invention to provide an apparatus, employing the catalyst of the invention, for treating diesel engine exhaust.

It is another object of the invention to provide such an apparatus which does not permit any increase in the pressure loss while the engine is in operation.

It is still another object of the invention to provide a process for manufacturing the catalyst.

In particular, it is the intention of the apparatus of the present invention to combine and make use of the advantages of both of the earlier above-described systems, permitting both the storage of carbon black or soot during the starting phase of the diesel engine and a combustion of the carbon black in the load phase with the reduction of nitric oxide without the creation of any excessive pressure loss.

SUMMARY OF THE INVENTION

Certain of the foregoing and related objects are readily attained according to the invention, by the combination of a filler catalyst and a honeycomb catalyst in such a way that in the filler catalyst, the exhaust gas is first freed from the carbon black or soot particles, and in the honeycomb catalyst for reducing the nitric oxides and for after-burning, the exhaust gas is subsequently purified further. The catalyst containing the filling or filler bodies is designed in such a way that the bed is capable of expansion when the pressure loss increases, so that any higher accumulation of soot in the cold starting phase cannot lead to any significant increase of the pressure loss. Furthermore, the free cross-sections of flow are designed so that a minimum amount of pressure loss occurs with the given size of the device.

In the operation of the apparatus according to the invention, the exhaust gas passes into an annular chamber after it has left the engine, the chamber having a filler catalyst and a filler filter disposed at the bottom end. The annular chamber has an eccentric design, so that an especially large cross section of flow is formed in the body of the filling, thereby allowing for a low loss of pressure.

For passing the exhaust gas into the honeycomb-type catalyst, a perforated closing plate is installed in the annular chamber, which prevents the particles of the filling from exiting from the body of filler material. Downstream of the perforated plate, the exhaust gas passes into the honeycomb catalyst. Thus, in its total course, the exhaust gas passes through the annular chamber with a temperature of about 270° C., through the filling of the catalyst, and it is then diverted by 180°, so that it follows a vertical path leading into the apparatus and thereafter follows a horizontal course of flow. This permits a space-saving design of the apparatus.

Now, surprisingly, it was found that the apparatus according to the invention does not only represent the optimal exploitation of space, but it also causes a particularly intensive sound damping or muffling. In this way, part of the pressure loss caused in the process can be compensated for by omitting the muffler in the exhaust system.

Other objects and features of the present invention will become apparent from the following detailed description considered in connection with the accompanying drawing which discloses several embodiments of the invention. It is to be understood, however, that the drawing is designed as an illustration only and not as a definition of the limits of the invention.

BRIEF DESCRIPTION OF THE DRAWING

In the drawing, wherein similar reference characters denote similar elements throughout the several views.

DETAILED DESCRIPTION OF THE PREFERRED EMBODIMENTS

Figure 2:
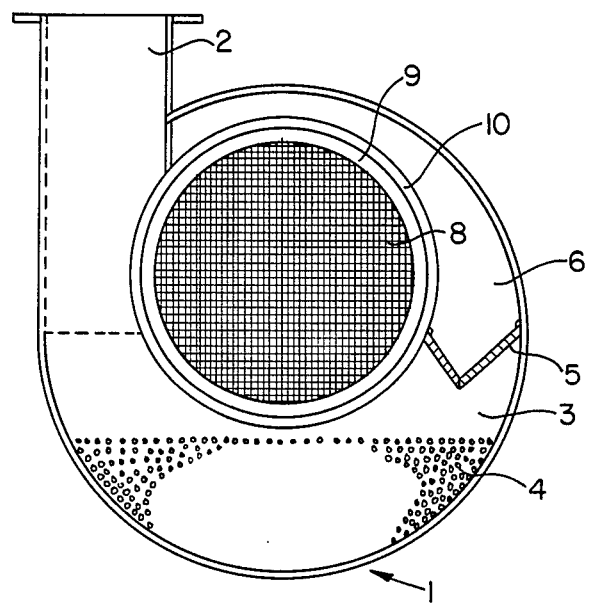
FIG. 2 is a sectional view thereof taken along line II—II of FIG. 1.
Figure 1:
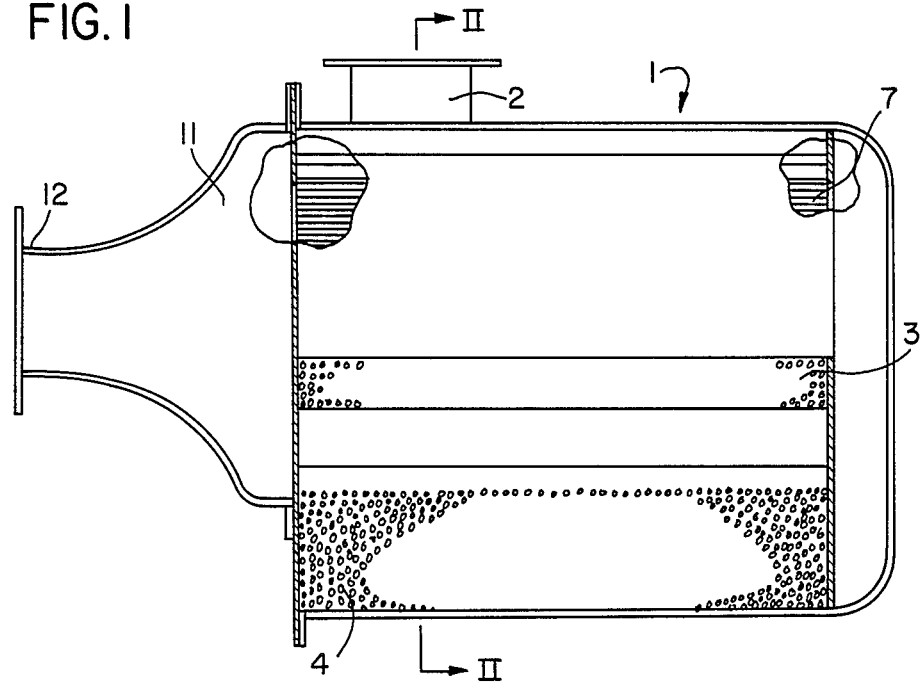
FIG. 1 is a side elevational view also in part section of the apparatus according to the present invention.

Turning now in detail to the appended drawing, therein illustrated is a novel diesel exhaust gas treatment apparatus embodying the present invention which, as shown in FIGS. 1 and 2, basically includes a short exhaust gas inlet pipe 2, which is tangentially inserted into apparatus 1. Inlet pipe 2 ends in and is connected to the eccentric annular space 3.

The filling material 4 consisting of catalytically coated filler bodies, for example, spheres, is contained within annular space 3. The perforated closing plate 5, which prevents the filler bodies from being discharged from the apparatus and into the exhaust gas system, is disposed in space 3 above the level of the filling of spheres, or filler bodies 4.

The transfer of the exhaust gas into the catalyst chamber 7 takes place in the transfer part 6 of the annular space 3. Transfer part 6 is followed by catalyst chamber 7, in which the catalyst 8 is embedded in the embedding 9 and enclosed by catalyst holder 10. The catalyst 8 is followed by the gas collecting chamber 11 and the exhaust pipe 12.

According to the invention, the catalyst is produced by applying to the ceramic carrier made of stable materials such as cordierite, zirconium oxide, magnesium-aluminum oxide-spinel, titanium oxide, aluminum oxide, or a combination thereof, a mixture of active catalyst components, in either one or two stages. The carrier materials have a porosity of 10% to 55% based on water absorption.

In the two-stage coating procedure, the ceramic carrier is coated in the first stage with a mixture of catalyst components such as readily decomposable lanthanum and thorium salts, for example nitrates or acetates, if need be in a suspension of acidified aluminum oxide, magnesium-aluminum oxide, thorium oxide, zirconium oxide, titanium oxide, or a combination thereof. For various applications, some further improvements are achieved by adding cerium salts. If need be, the catalytic substance applied to the ceramic body is reduced or activated in a subsequent activating process. The addition of all other known salts deteriorates the durability and catalytic activity to such an extent that the purity of the materials, particularly with respect to alkalis, is very important.

In the second stage, only a mixture of $LaCoO_3$ in an acid solution of nitric acid, acetic acid, or other organic acids for stabilizing, is applied together with the salt of the thorium, for example, thorium nitrate or the acidified thorium oxide. The baking and decomposition step, which prevents the second impregnation step from removing the materials of the first impregnation, is carried out between the two stages. Alternatively, the preparation may be carried out in one stage, in which all components admixed in a solution or suspension are applied to the ceramic body. The selection of the composition of the solution with respect to the addition of oxide-ceramic substances depends on the composition of the ceramic body. Ceramic materials such as silicates require the addition of oxide-ceramic substances, whereas oxide-ceramic carriers do not require such additions.

Based on a silicatic carrier or inactive ceramic body, the following composition ranges of components are effective: Oxide-ceramic substances as oxides or readily degradable salts=60% to 95%; $LaCoO_3$=4% to 30%; thorium oxide=1% to 5%; lanthanum oxide =1% to 9%; and other components such as cerium oxide=about 1% to 5%. Compared to the mass of basic ceramic substance the applied substances come to 6% to 12%, assuming that the porosity or water absorption of the basic substance is from 20% to 50%. The composition of the solution in one preferred embodiment for a silicatic carrier or inactive body is as follows: 8% to 30% thorium oxide or cerium oxide, 8% to 30% lanthanum oxide, and 30% to 84% $LaCoO_3$.

Based on an oxidic carrier, the addition of active substance in the form of oxides in acidified solution or readily decomposable salts of the materials $LaCoO_3$, thorium oxide, lanthanum oxide and other oxides such as, for example, cerium oxide, comes to a total of from 0.1% to 3%. As compared to $LaCoO_3$, the content of thorium oxide is from 1% to 10%. The ratio of thorium oxide to lanthanum oxide is from 1:1 to 1:10. The addition of other substances such as cerium oxide is on the order of about 20% to 200% of the amount of thorium oxide. If the thorium oxide is added in two stages as previously described, the amount added in the second stage is 20% to 100% and, preferably, 50% to 90% of the amount added in the first stage.

According to the invention, the active substance $LaCoO_3$ is added not in the form of the salts of the individual components, but is formed first in a baking process, brought into solution as a complex and applied either jointly with the wash coat or applied by impregnation, baking, and activation, in a subsequent process step. The advantage of the joint application of $LaCoO_3$ and the wash coat is the enhanced action of the two components of the wash coat as components of the catalyst complex that stabilize the grain limits and prevent the chemical dissolution of the catalyst complex in the impregnation step. The wash coat may contain from 1% to 10% by mass lanthanum and thorium with the two components having a ratio of 20% to 80%, i.e., 1 part by mass thorium to 4 parts by mass lanthanum up to 4 parts by mass thorium to 1 part by mass lanthanum. In a preferred embodiment, the catalyst substances of the impregnating solution are comprised of 20% to 90% $LaCoO_3$, 2% to 10% thorium oxide, 2% to 20% lanthanum oxide, with the non-ceramic substances amounting to 0.1% to 3% of the total weight. Without prior formation of the catalyst complex, the catalyst action of the catalyst is impaired by the formation of cobalt aluminate and other secondary reactions. If sulfur components are present, only the $LaCoO_3$ is capable of maintaining its catalytic action. Magnesium-aluminum oxide spinel, thorium oxide, and zirconium oxide are particularly suitable basic wash coat substances.

The wash coat is applied to the ceramic body by heating the ceramic body to about 100° C. and preparing the catalyst at room temperature by solubilizing the oxide, nitrates and spinels of the aluminum, titanium and zirconium compounds in an acid solution and by adding cerium salts in lanthanum salts in a specified ratio to suspension.

In the preferred embodiment, the active component is formed and applied by prior baking of the individual substances, fine grinding of the oxides, and subsequent acid sobulizing.

With the the catalyst formed by this process, it is possible to reduce both the nitric oxide proportions of a flue gas with an addition of combustible gas components, and to accelerate the combustion processes. For example, a gas-air mixture with a low caloric value may be burned in such a catalyst, wherein a combustion volume of only a few percent is required as compared to the flame volume. Without the active $LaCoO_3$-component, a catalyst so formed is capable of catalyzing a combustion of 1200° C. and higher, as is required in the nitric oxide-free heat generation from coal. With such high temperatures the component $LaCoO_3$ has to be dispensed with because it may decompose in the process. In this case, the catalyst is finished and ready for the combustion even before the solution containing the $LaCoO_3$ is added.

The invention will now be explained more fully in a number of examples which are, however, only given by way of illustration and not of limitation.

EXAMPLE I

A cordierite honeycomb-type body with a square geometry intake area of 200×200 mm and a length of 500 mm, and with flow ducts sized 5×5 mm and a bridge width of 0.5 mm is coated with the catalyst according to the invention. The ceramic body has a water absorption of 35% and is immersed in a solution of 5 N nitic acid containing the substances according to the invention, at room temperature. The suspension of the liquid, which is based on 5 N nitric acid, contains the active components in the following amounts: 90% magnesium-aluminum oxide spinel; 8% $LaCoO_3$; 1% lanthanum nitrate; and 1% thorium nitrate.

Following the saturation step, in which the weight of the ceramic body increases by 30%, the body is baked for 6 hours at 600° C. The body retains a weight increase of 8%. In the form so finished, the body is used for the reduction of nitric oxide or for the combustion of gas with a low caloric value in the second combustion chamber of the nitric oxide-free power plant.

EXAMPLE II

An extruded honeycomb body made of cordierite with dimensions of 100×100×100 mm, a hole size of 4×4 mm, and a bridge width between the ducts of 1 mm is stirred into a wash coat consisting of 20 parts finely ground magnesium-aluminum oxide spinel, 1 part thorium nitrate, and 1 part lanthanum nitrate in a 4 N nitric acid solution of 78 parts by mass.

The resulting mixture is stirred for about 1 hour and, if need be, diluted further depending on the porosity of the basic body. On its side, the cordierite body is provided with an orifice and the wash coat liquid is passed through the body, which was preheated to about 100° C. At the inlet, the wash coat liquid is at about room temperature.

Following drying of the body, it is baked in an oven at 1000° C. On baking, the ducts of the body have a surface layer or coating of 0.1 mm thickness, and based on the porosity of the cordierite body, the pore structure of the body is filled to 20% by volume with wash coat. The active substance is prepared by converting the salts of the two components, La and Co, by dissolution and baking of the solution with the stoichiometric ratio of the complex $LaCoO_3$ as completely as possible into the complex. This requires baking temperatures of about 1000° C. and from 2 to 4 hours baking time.

The complex formed thereby is brought into solution by acid formers, for example, by admitting $CO_2$ into the suspension of finely ground $LaCoO_3$ and water, or by bringing the ground complex into solution with nitric acid or acetic acid. The coated body is impregnated with this substance by immersing it in the solution. The impregnated body is then baked between 50° C. and 400° C. and reduced at higher or lower temperatures depending on the application. For nitric oxide removal applications, a higher selectivity and activity is achieved if a temperature of 500° C. is not exceeded in the baking process. For applications in the range of 800° C., the latter temperature may be applied also in the baking step. If the wash coat and the active substance are jointly applied, the baking temperature of the one-time baking is reduced accordingly. The amount of active $LaCoO_3$ substance applied to the catalyst body should be equal to or greater than the amount of La and cerium introduced with the wash coat. In the present embodiment, the ratio of 2 parts $LaCoO_3$ to 1 part La- and thorium- mixture was selected with these two components having a ratio of 1:1. This means that a total of 8% wash coat with 0.16% thorium and lanthanum and 0.32% $LaCoO_3$ based on mass has been applied to the cordierite body. The catalytic layer contains the active components.

The following examples illustrate application of the present invention to treat diesel exhaust gas:

EXAMPLE III

A 1.6-liter diesel engine consumes 7 kg diesel oil per hour The engine is operated with an air ratio of 1.36. Referring to FIGS. 1 and 2, catalyst honeycomb 9 has a diameter of 100 mm and short inlet pipe 2 has a diameter of 40 mm. The height of the heaped spheres of the filling 4 is 4 cm. The temperature therein comes to 600° C. and the pressure loss comes to 0.25 bar with 80% of the pressure loss resulting solely from the loss of the spheres filling.

EXAMPLE IV

Referring once more to FIGS. 1 and 2, tangential inlet pipe 2 with a diameter of 40 mm is welded to an annular chamber 3 having a diameter of 160 mm. The catalyst support 10, with a diameter of about 120 mm, is supported or held in annular chamber 3 with about a 20 mm eccentricity. The exhaust gas catalyst is installed so that in the horizontal arrangement, the largest width of the annular gap is about 42 mm and comes to rest facing downwardly. In this way, the bodies of filling 4, for example, spheres with a diameter of 5 mm, will always come to rest at the bottom of the annular chamber 3, leaving the required flow sections open. A perforated plate 5 of sheet metal provided with about 3 mm diameter bored holes serves to retain the spheres. Plate 5 is installed in such a way that the rate of flow of the exhaust gas through the holes of the plate is kept constant. The space above perforated plate 5 adjoins the catalyst chamber with an opening of about 15 cm², from where the exhaust gas, after passing through the catalyst, passes into gas collecting chamber 11 and from there into the exhaust system.

While several embodiments of the present invention have been shown and described, it will be obvious that many changes and modifications may be made thereunto without departing from the spirit and scope of the invention.

What is claimed is:

1. A catalyst for converting hydrocarbons, nitric oxides, and combustion gases comprising:

LaCoO₃ serving as a catalyst component, and thorium oxide serving as both a catalyst component and a stabilizer.

2. The catalyst according to claim 1, utilizing one other component which is a ceramic oxide material selected from the group consisting of the oxides of thorium, zirconium, cerium, aluminum, magnesium-aluminum oxide spinel, and lanthanum.

3. The catalyst according to claim 1, wherein the catalyst components thorium oxide and lanthanum oxide are used in a ratio of 1:1 to 1:10.

4. The catalyst according to claim 1, wherein cerium oxide is added as an additional component with a ratio of 0.2 to 2 to said thorium oxide.

5. The catalyst according to claim 1, wherein said catalyst components comprise 8% to 30% of a member selected from the group consisting of thorium oxide or cerium oxide; 8% to 30% lanthanum oxide; and 30% to 84% LaCoO₃.

6. A process for preparing a ceramic body catalyst for converting exhaust gas hydrocarbons, nitric oxides, and combustion gases comprising the steps of:
coating a ceramic body with catalyst components including LaCoO₃ and thorium oxide; and
baking the coated ceramic body.

7. The process according to claim 6, further comprising the steps of separately preparing LaCoO₃ in an acid-stabilized state and applying it to the ceramic body.

8. The process according to claim 6, wherein the ceramic body is coated first with a wash coat comprising of a ceramic-oxide substance containing from 1% to 10% by mass lanthanum and thorium with the two components having a ratio of 20% to 80%.

9. The process according to claim 6, further comprising the steps of:
preparing a suspension of the catalyst components as oxides or salts in an organic acid solution of the acid associated with the salts; and
applying the suspension to the ceramic body.

10. The process according to claim 6, further comprising the step of:
decomposing the catalyst component applied to the ceramic body by subsequently rebaking the ceramic body at a temperature range not exceeding 1000° C.

11. The process according to claim 10, further comprising the steps of activating the catalyst components by exposing it to baking gas at from 50° to 400° C.

12. The process according to claim 6, wherein the catalyst component is applied by impregnation in a first stage, and the LaCoO₃ and a second portion of the thorium oxide or thorium salt is applied by impregnation in a second stage following the baking process, such that the ratio of the thorium oxide content between the first and second stages is in the range of from 1:1 to 5:1.

13. The process according to claim 8, wherein the wash coat includes oxide-ceramic substances selected from the group consisting of magnesium-aluminum oxide spinel, titanium oxide, zirconium oxide, and a combination thereof.

14. The process according to claim 8, wherein the wash coat includes a member selected from the group consisting of lanthanum oxide, thorium oxide, cerium oxide and a combination thereof, and is applied to the ceramic body without the LaCoO₃, for the application of the catalyst as a combustion catalyst at temperatures above 700° C.

15. The process according to claim 6, wherein the catalyst component is formed and applied by prior baking of the individual substances, fine grinding of the oxide, and subsequent acid solubilizing.

16. A ceramic body catalyst comprising an inactive ceramic body supplied with a coating of catalyst components comprising LaCoO₃ and thorium oxide.

17. The ceramic body catalyst according to claim 16, wherein the coating contains from 60% to 95% of an oxide-ceramic substance; 4% to 30% LaCoO₃; 1% 5% thorium oxide, 1% to 9% lanthanum oxide; with the coating making up from 6% to 12% of the total mass of the body.

18. The ceramic body catalyst according to claim 17, wherein the oxide-ceramic substance is a member selected from the group consisting of zirconium oxide, magnesium-aluminum oxide spinel, aluminum oxide, titanium oxide, and a combination thereof, and wherein the coating additionally includes 1% to 5% cerium oxide.

19. The ceramic body according to claim 16, wherein the ceramic body is supplied with a catalyst component by solution impregnation and non-ceramic substance amounts to 0.1% to 3% by weight with the proportion of the catalyst components of the impregnating solution being 20% to 90% LaCoO₃; 2% to 10% thorium oxide; and 2% to 20% lanthanum oxide, with the balance thereof being other components.

20. The ceramic body according to claim 16, wherein the inactive ceramic body has a porosity of 10% to 55% based on water absorption.

21. The ceramic body catalyst according to claim 16, wherein the inactive ceramic body is a member selected from the group consisting of cordierite, zirocnium oxide, magnesium-aluminum oxide spinel, aluminum oxide, and a combination thereof.

* * * * *